United States Patent [19]

Nystrom et al.

[11] 4,144,777

[45] Mar. 20, 1979

[54] CIRCULAR SAW BLADE AND METHOD FOR MAKING THE SAME

[75] Inventors: Lars I. Nyström; Bengt Lagerström, both of Lidkoping, Sweden

[73] Assignee: Sandvik Aktiebölag, Sandviken, Sweden

[21] Appl. No.: 837,424

[22] Filed: Sep. 28, 1977

[30] Foreign Application Priority Data

Sep. 28, 1976 [SE] Sweden .............................. 7610700

[51] Int. Cl.² ........................................... B23D 63/00
[52] U.S. Cl. .................................................. 76/112
[58] Field of Search .......................... 76/112, 101 R; 219/121 EB, 121 EM; 125/15

[56] References Cited

U.S. PATENT DOCUMENTS

| | | | |
|---|---|---|---|
| 1,919,358 | 7/1933 | Bem ........................................ | 76/112 |
| 3,315,548 | 4/1967 | Anderson et al. ..................... | 76/112 |
| 3,343,308 | 9/1967 | Fessel .................................... | 125/15 |
| 3,685,373 | 8/1972 | Norfolk ................................. | 76/112 |
| 3,991,930 | 11/1976 | Ekerot ................................... | 76/112 |

*Primary Examiner*—Harold D. Whitehead
*Assistant Examiner*—Roscoe V. Parker
*Attorney, Agent, or Firm*—Burns, Doane, Swecker & Mathis

[57] ABSTRACT

The circular saw blade of the invention is composed of different materials and consists of three concentric zones, — an inner zone, intermediate zone and an outer zone, — welded together. The material of the outer zone is a high-speed steel, the outer and intermediate zones are joined together by, for instance, electron beam welding, while the intermediate and inner zones are joined together by a welding method other than electron beam welding.

The present invention relates to the saw art, and is concerned with the provision of an improved circular saw blade.

12 Claims, 1 Drawing Figure

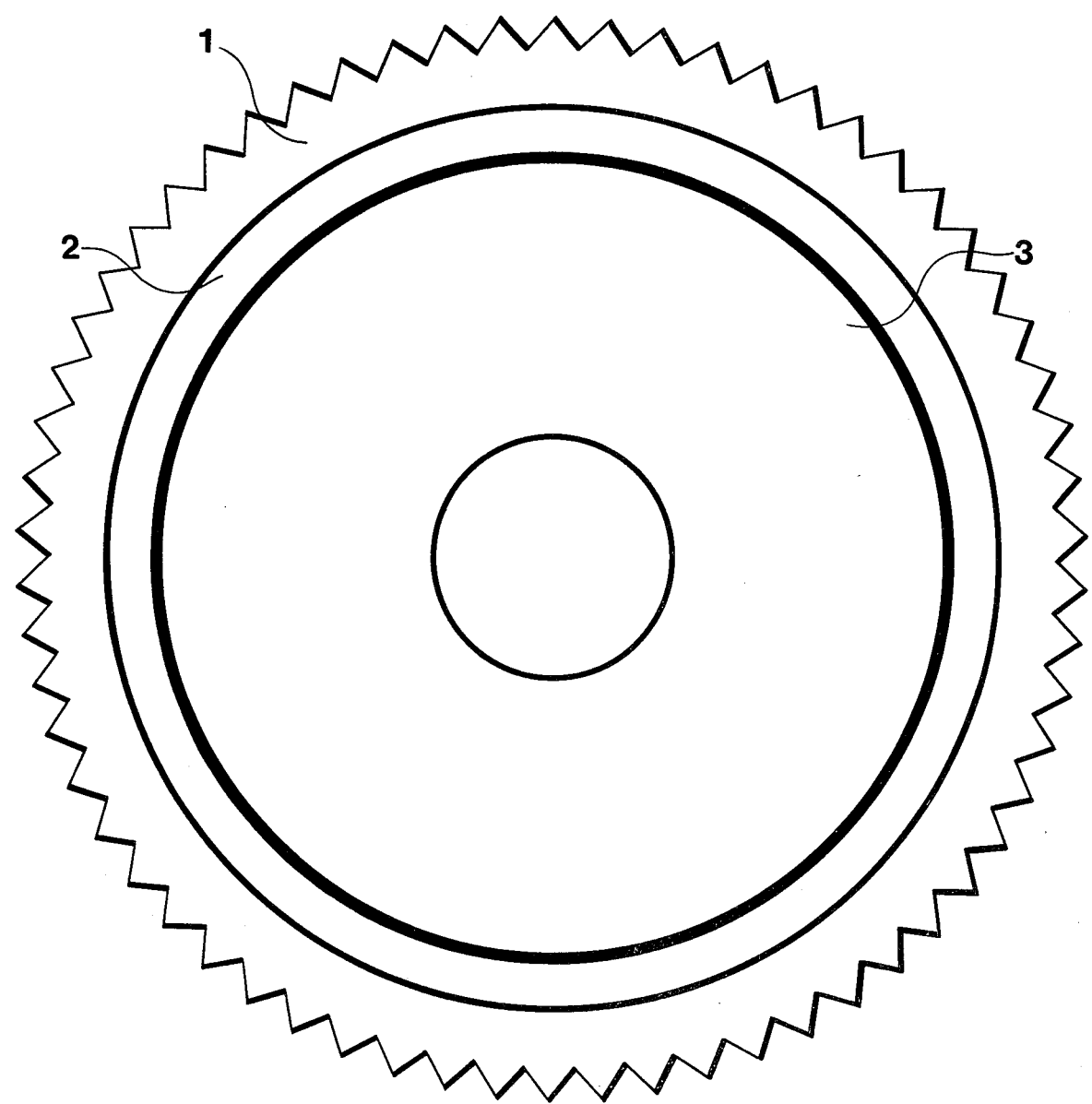

CIRCULAR SAW BLADE AND METHOD FOR MAKING THE SAME

It previously was known to make circular saw blades with teeth of high-speed steel and a back of another material by welding a band of high speed steel, which has been bent, onto a round (i.e., a circular disc) of low-alloy steel, for instance tool steel, and then form the teeth by grinding, milling or punching. In this mode of manufacture conventional welding methods have been used wherein filler material is supplied to the weld joint. Such methods, however, are associated with a troublesome drawback. The welding takes a relatively long time, leading to the result that a fairly great area around the weld joint is warmed up. Thereby the risk for diffusion of carbon from the low-alloy steel to the high speed steel is extremely great, leading to the result that the high-speed steel becomes brittle with a decreased life. Therefore, the possibilities for using electron beam welding have lately been examined.

Electron beam welding, which is effected in vacuum and without supply of filler material, is a very fast welding method, which eliminates the risk of embrittlement of the adjacent layer of the high speed steel owing to the fact that there is no time for carbon diffusion from the adjacent layer into the layer of the high speed steel. Electron beam welding, however, has until now not been able to be used much in the production of circular saw blades, for these reasons. Firstly, this welding method requires high precision in the fit of the embraced details in order to effect the weld joint satisfactorily. This has led to the result that several preparatory working moments have to be made in order to get good fit between round and layer of high speed steel bearing against the round, which in turn leads to a time-consuming and expensive production. Secondly, the welding has to be made in a vacuum chamber, hence the production speed when welding circular saw blades piece by piece becomes low since the chamber has to be evacuated after every insertion of a saw blade or a smaller group of saw blades into the same. Thirdly, at the high welding temperature owing to heat expansion differences between high speed steel and tool steel there arise compressive stresses in the high speed steel after cooling, which requires a difficult and expensive straightening of the saw blade.

The present invention is intended to solve these problems and is explained more thoroughly below with reference to the accompanying drawing in which The single FIGURE is a plane view of a circular saw blade.

Referring now to the drawing, the saw blade is composed of three concentric zones of different materials. The outermost zone 1, within which the teeth are situated, consists of high speed steel. The intermediate zone 2 is composed of a steel of great toughness and the inner zone 3 consists of a tool steel of such a structure, for instance alloyed with chromium and vanadium, that during the heat-treating required for giving the highest wearing strength to the high speed steel, the steel acquires great hardness as well as great toughness. The intermediate zone 2 has such a structure, for instance austenitic steel with high content of nickel, that diffusion of carbon from the inner zone 3 to the high speed steel in the outer zone 1 can be prevented. Instead of austenitic steel, the intermediate zone 2 may consist of tool steel of suitable quality and with a higher carbon content than that of the austenitic steel.

In order to prevent diffusion of carbon from the intermediate zone 2 into the outer 1 the joint is made by electron beam welding. In order to make this welding rapidly and effectively, and thereby profitable from the viewpoint of business economics, the material in the outer and intermediate zones consists of long, straight bands, which are continuously fed through the vacuum chamber and welded together in the same. Thereby no particular evacuation of the chamber is required, which otherwise should be necessary in welding of saw blades piece-by-piece.

After the welding the joined bands are cut to suitable lengths and formed into a ring, whereafter joining with the material in the inner zone in the form of a round is made by some conventional welding method, for instance plasma welding or arc welding. This welding is made in air and with the supply thereto of filler material, whereby the fit between the joined outer bands and the inner round does not require the precision that would be necessary if the joining were made by electron beam welding. The materials forming the outer and intermediate zones are thicker than the material in the inner zone and, after the joining with this material, are ground in such a way, that they acquire a decrease in thickness in the direction towards the center of the saw blade. This is made in order to prevent frictional contact between the sidewalls of the saw blade and the material being sawed.

As noted hereinbefore, saw teeth are formed in the outer zone (1) of the circular saw blade by a known technique including grinding, milling or punching.

It will be understood that the invention is not limited to the described embodiment. Thus, it is possible to use another welding method than electron beam welding, which method is also effected without supply of filler material, for instance resistance welding and welding by means of laser.

We claim:

1. Method of making a circular saw blade composed of different materials and having three concentric zones welded together, which comprises
    placing together a straight band of material forming an outer zone of the saw and a straight band of a material forming an intermediate zone lying inside the outer zone;
    joining the two straight bands together by welding to form an intermediate product;
    bending the resulting intermediate product to a circular form;
    placing the circular intermediate product around a circular disc of material forming an inner zone of the circular saw blade; and
    joining said product and said disc together by a welding method thereby forming a circular saw blade.

2. Method according to claim 1, in which the joining of the outer zone and the intermediate zone is effected by a welding method without supply of filler material.

3. Method according to claim 2, in which the joining of the intermediate product and inner zone is effected by a welding method in air with the aid of filler material.

4. Method according to claim 3, in which after welding together the two outer zones with the inner zone the two outer zones are ground in such a way that they acquire a thickness decreasing in the direction towards the center of the saw blade.

5. Method according to claim 1, wherein the first named placing step includes placing a straight band of high speed steel forming an outer zone, and said second-named placing step includes placing the intermediate product around a circular disc of tool steel forming an inner zone.

6. Method according to claim 5, wherein said first named placing step includes placing a straight band of tool steel forming an intermediate zone, such tool steel being of the same quality as that of the inner zone.

7. Method according to claim 5, wherein said first named placing step includes placing a straight band of tool steel forming an intermediate zone, such tool steel being of another quality as that of the inner zone.

8. Method according to claim 5, wherein said first named placing step includes placing a straight band of steel forming an intermediate zone, such steel being of a type preventing the diffusion of carbon atoms from the tool steel of the inner zone to the high speed steel of the outer zone.

9. Method according to claim 8, wherein said first named placing step includes placing a straight band of an austenitic steel having a carbon content of not more than 0.20%.

10. Method according to claim 1, including tapering the thickness of the intermediate and outer zones towards the center of the saw blade.

11. Method according to claim 2, wherein said first named joining step includes joining the intermediate and outer zones by electron beam welding, laser welding or resistance welding.

12. Method according to claim 3 wherein said second named joining step includes joining the intermediate product and inner zone by plasma welding or arc welding.

* * * * *